US008646140B2

(12) United States Patent
Branyon (10) Patent No.: US 8,646,140 B2
(45) Date of Patent: Feb. 11, 2014

(54) PAPER RAMP (75) Inventor: Jacob Branyon, Springfield, TN (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 13/643,654

(22) PCT Filed: Apr. 18, 2011

(86) PCT No.: PCT/US2011/032836
§ 371 (c)(1),
(2), (4) Date: Oct. 26, 2012

(87) PCT Pub. No.: WO2011/146190
PCT Pub. Date: Nov. 24, 2011

(65) Prior Publication Data
US 2013/0042423 A1 Feb. 21, 2013

Related U.S. Application Data (60) Provisional application No. 61/345,890, filed on May 18, 2010.

(51) Int. Cl.
B65G 69/28 (2006.01)
(52) U.S. Cl.
USPC .......................................... 14/69.5
(58) Field of Classification Search
USPC ....... 14/69.5; 254/88; D34/32; 229/115, 116; D9/431, 433
See application file for complete search history.

(56) References Cited

U.S. PATENT DOCUMENTS

| 662,969 | A | * | 12/1900 | Roth | 229/115 |
| 1,597,757 | A | * | 8/1926 | Berger | 229/210 |
| 2,419,510 | A | * | 4/1947 | Van Rosen | 229/115 |
| 2,444,987 | A | * | 7/1948 | Giessen | 229/115 |
| 2,491,718 | A | * | 12/1949 | Densmore | 254/88 |
| 4,371,298 | A | * | 2/1983 | Van Iperen | 410/25 |
| 4,476,961 | A | * | 10/1984 | Luigi | 188/32 |
| 4,492,333 | A | * | 1/1985 | Roberts | 229/115 |
| 4,668,002 | A | * | 5/1987 | Hanson | 296/61 |
| 5,505,140 | A | | 4/1996 | Wittmann | |
| 5,598,594 | A | * | 2/1997 | Milliken et al. | 14/69.5 |
| 5,743,689 | A | * | 4/1998 | Schlaeger | 410/30 |
| 5,781,954 | A | * | 7/1998 | Mayer | 14/69.5 |
| 5,911,179 | A | | 6/1999 | Spiczka | |

(Continued)

FOREIGN PATENT DOCUMENTS

NL 1023766 C2 * 12/2004 ............ B65G 69/28

OTHER PUBLICATIONS

Anni Arts, "The Wedding Template Collection", Wayback Machine capture date: May 16, 2009, downloaded from http://www.anniarts.com/weddingtemplate.html.*

Primary Examiner — Thomas B Will
Assistant Examiner — Jessica H Lutz
(74) Attorney, Agent, or Firm — Miller, Matthias & Hull LLP (57) ABSTRACT A paper ramp for use in unloading a wheeled or castered product from a pallet or shipping base is provided. The ramp is wedge shaped and comprises a folded bottom member affixed to a pre-formed top member having integrally formed guide rails. The bottom member has closure flaps that fold together in interlocking fashion inside the wedged shaped ramp to support and stabilize the load bearing top surface of the ramp.

7 Claims, 5 Drawing Sheets

(56) References Cited

U.S. PATENT DOCUMENTS

| | | | |
|---|---|---|---|
| D428,336 S * | 7/2000 | Persson et al. | D9/433 |
| 6,105,511 A | 8/2000 | Bridges | |
| D434,542 S * | 11/2000 | Wickstead | D34/32 |
| 6,240,854 B1 | 6/2001 | Heil | |
| 6,494,812 B1 * | 12/2002 | Grimes, Jr. | 482/14 |
| 6,634,848 B2 * | 10/2003 | Henderson | 414/537 |
| 6,701,563 B2 * | 3/2004 | Schomaker et al. | 14/69.5 |
| 6,708,361 B1 * | 3/2004 | Emerson, Jr. | 14/69.5 |
| 6,745,422 B1 * | 6/2004 | Emerson, Jr. | 14/69.5 |
| 6,769,368 B2 | 8/2004 | Underbrink et al. | |
| 6,935,619 B2 * | 8/2005 | Chamoun | 254/10 B |
| D543,675 S * | 5/2007 | Ji | D34/32 |
| 7,222,838 B1 * | 5/2007 | Ji | 254/88 |
| 7,984,518 B1 * | 7/2011 | Jarvis | 4/496 |
| 8,167,731 B2 * | 5/2012 | Brown | 472/90 |
| 8,263,205 B2 * | 9/2012 | Kweder | 428/113 |
| 2002/0108190 A1 * | 8/2002 | Martinez | 14/69.5 |
| 2004/0108238 A1 | 6/2004 | Maresh | |
| 2004/0232021 A1 | 11/2004 | Linton | |
| 2008/0000397 A1 | 1/2008 | Dickinson et al. | |

* cited by examiner

PAPER RAMP

CROSS-REFERENCE TO RELATED APPLICATIONS

This application is a 35 USC §371 U.S. national stage filing of International Patent Application No. PCT/US2011/032836 filed on Apr. 18, 2011, which claims priority under 35 USC §119(e) to U.S. Provisional Ser. No. 61/345,890, filed on May 18, 2010.

BACKGROUND OF THE INVENTION

1. Field of the Invention

This invention patent relates to packaging. More particularly, this invention relates to a ramp made from a folded paper bottom member and a pre-formed paper top member that can be used, for example, to unload a castered product from a pallet or shipping base.

2. Description of the Related Art

Large household appliances and other articles often are shipped in protective packaging which includes a shipping base, vertical supports, a top cap, and an outer carton or transparent plastic wrapping. The article may be placed on the base during assembly and stays on the base until the article reaches its final destination. There the packaging is removed and the article lifted or otherwise taken off the base.

Modern appliances often have casters or wheels for easier moving. However, even with casters or wheels it remains difficult to move a large article off its shipping base and onto the surrounding floor. Various ramps have been incorporated into product packaging designs to make this task easier. For example, U.S. Pat. No. 5,505,140 discloses a pallet having wooden ramps that can be stored underneath the load bearing surface of the pallet and pulled out for use. U.S. Pat. No. 5,911,179 discloses a ramp hingedly attached to a pallet deck. U.S. Pat. No. 6,105,511 discloses a pallet and a pair of boards that can be used as ramps and that can be stored on top of the pallet when not in use. U.S. Pat. No. 6,240,854 discloses a pallet for a wheeled item, the pallet having ramps formed on the pallet surface and wedges that fit within the ramps to help load the wheeled article onto the pallet. Once the article is loaded onto the pallet the wedges are removed and the article's undercarriage is supported by an integrally formed support member. A separate loading ramp is provided for loading the article onto the pallet. U.S. Pat. No. 6,769,368 discloses a ramp hingedly attached to a pallet deck. U.S. Patent Publication No. 2004/0108238 discloses a shipping carton base having hinged ramps attached to the base. The ramps are preferable made of plywood. U.S. Patent Publication No. 2004/0232021 discloses a shipping container having a ramp attached to the container floor by hinges. U.S. Patent Publication No. 2008/0000397 discloses a shipping container having a plywood ramp attached to the container floor by hinges.

None of these references describes a ramp that is made entirely from a multi-layer folded paper blank. This may be because heretofore no one has successfully developed a paper ramp that can withstand the load forces of a large castered or wheeled article.

This it is an objective of the present invention to provide a paper ramp for enabling a castered article to be easily moved off a shipping base.

Another object of the present invention is to provide a paper ramp that can be made from a multi-layer folded blank.

BRIEF SUMMARY OF THE INVENTION

The present invention is intended to achieve these objectives by providing a paper ramp for use in the unloading of a wheeled or castered product from a pallet or shipping base. The paper ramp comprises a folded bottom member and a separate pre-formed top member affixed to the bottom member.

The bottom member is made from a paper blank folded into a wedge shaped structure defining an interior space. The blank may be made from a single paper ply or, preferably, from two or more die cut paper sheets (plies) laminated together in flat orientation. The blank is then folded into a wedge shaped structure for use as the bottom member.

The folded bottom member comprises a sloping top panel having opposing side edges, two vertically oriented, opposing, substantially triangular side panels foldably attached to the top panel along the opposing side edges, each side panel defining a bottom edge and a rear edge, a horizontally oriented bottom panel foldably attached to each side panel along the bottom edge, a tabbed closure flap attached to one of the side panels along the rear edge, and a slotted closure flap attached to the other side panel along its rear edge. The closure flaps are folded inside the wedge shaped structure interior space and cooperatively engage each other and provide additional load bearing support.

The pre-formed top member comprises an elongated flat upper panel having a length, opposing side edges and two integrally formed raised guide rails located in spaced parallel relationship and extending the length of the upper panel. The top member is affixed to the bottom member such that the upper panel is in flat abutting relationship with the sloping top panel.

The top member may also comprise side closure flaps extending downward from the side edges. A fold line runs transversely from one upper panel side edge to the other side edge, dividing the upper panel into a large upper panel and a smaller extension panel. The extension panel extends rearward beyond the wedged shaped structure and can be folded slightly downward along the fold line and oriented in a horizontal plane so that it rests on the base or pallet.

DETAILED DESCRIPTION OF THE INVENTION

While this invention may be embodied in many forms, there is shown in the drawings and will herein be described in detail one or more embodiments with the understanding that this disclosure is to be considered an exemplification of the principles of the invention and is not intended to limit the invention to the illustrated embodiments.

The Paper Ramp

Figure 1:
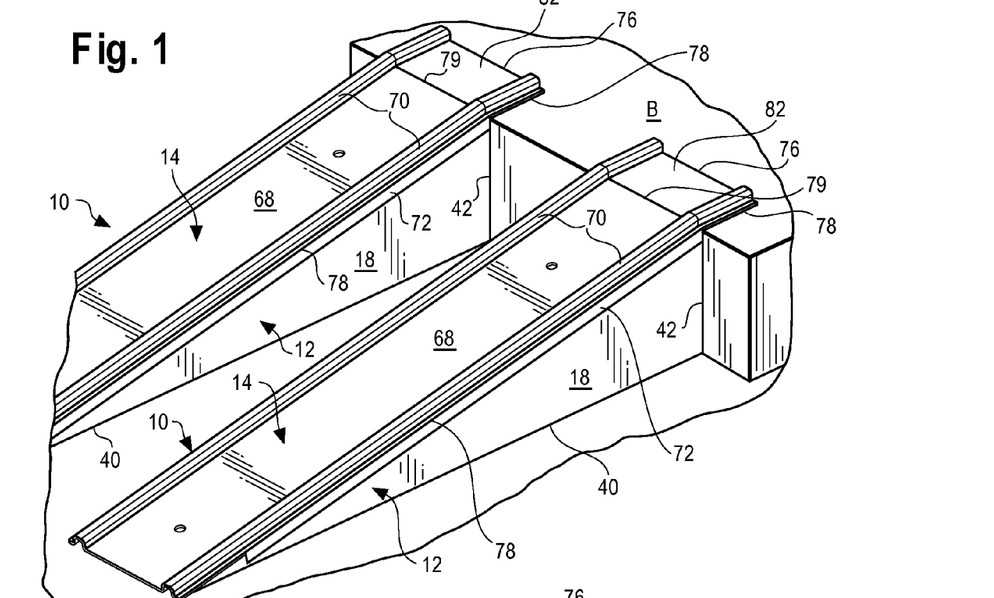
FIG. 1 is a perspective view of a pair of ramps according to the invention.

Turning to the drawings, there is shown in FIG. 1 a pair of paper ramps 10 made according to the present invention. Each paper ramp 10 may be used singly or, more typically, with another paper ramp 10 as shown to aid in the loading or unloading of a castered or wheeled article from a pallet or shipping base (B). The ramp 10 is substantially wedge shaped and comprises a bottom member 12 made from a folded paper blank and a separate, preformed paper top member 14.

Figure 2:
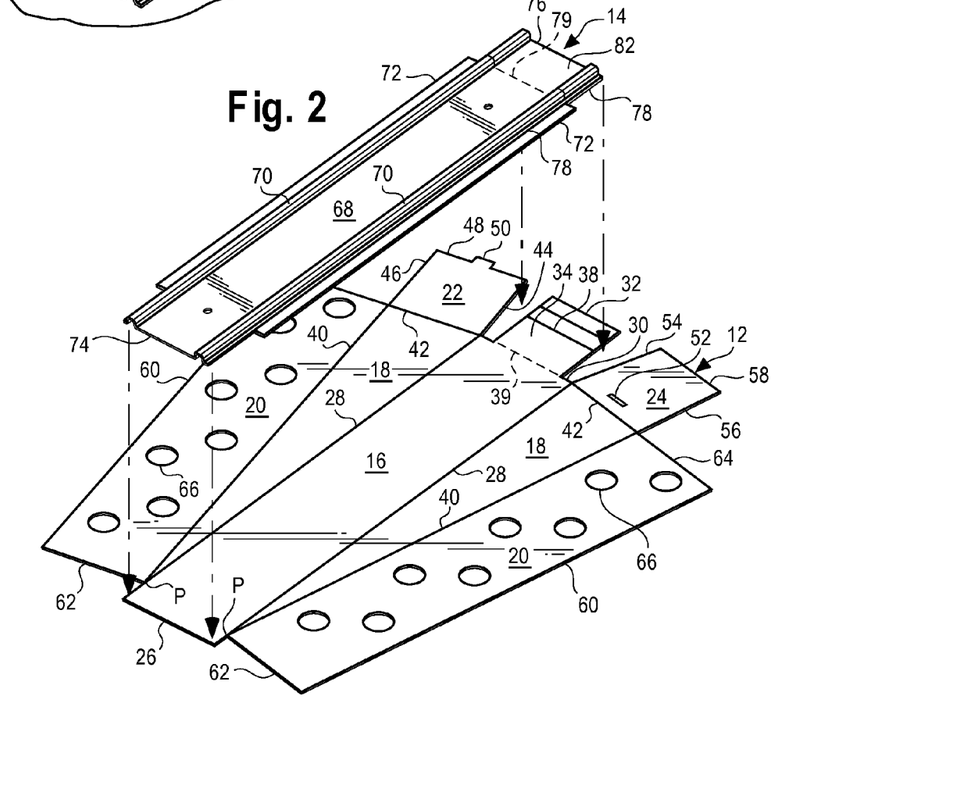
FIG. 2 is a perspective view of the top and bottom members used to make either of the paper ramps of FIG. 1, the bottom member shown as a blank prior to folding.
Figure 3:
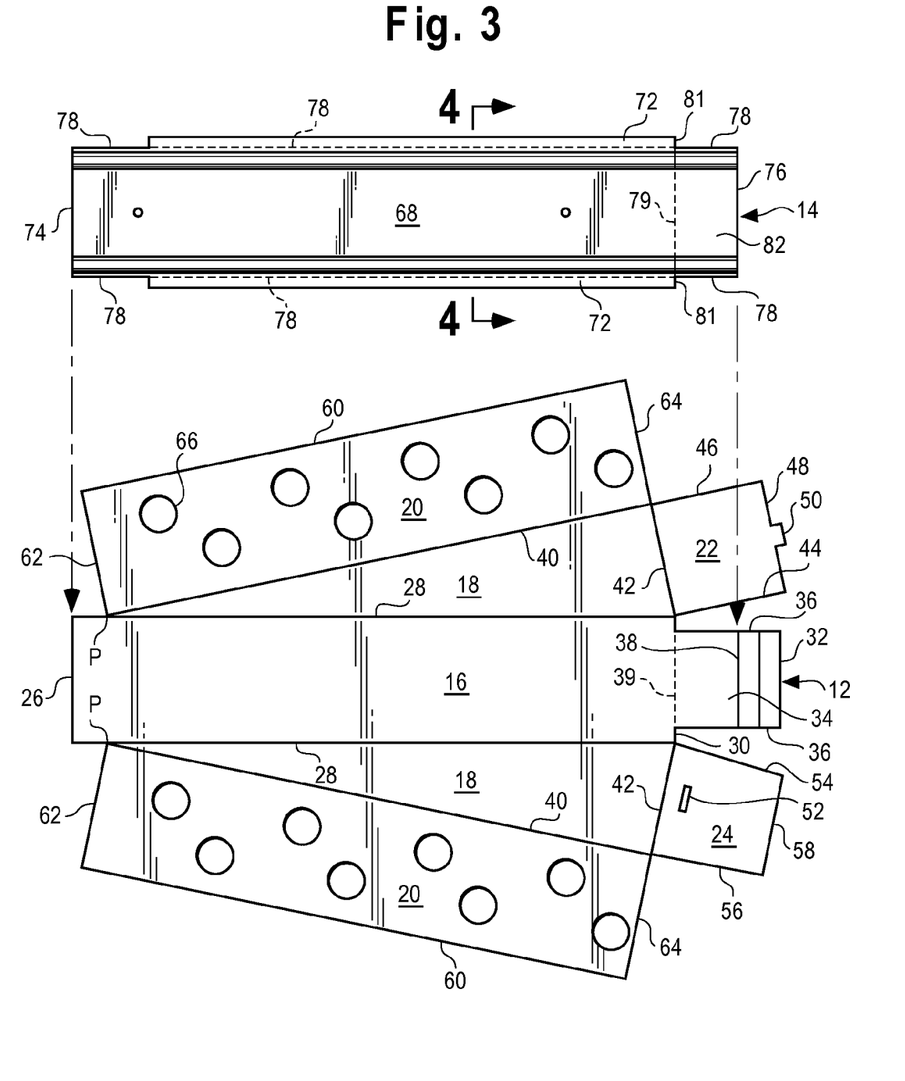
FIG. 3 is a top view of the top member and unfolded bottom member of FIG. 2.

FIGS. 2 and 3 are alternate views of the bottom and top members 12, 14 used to make the paper ramp 10 of FIG. 1, with the bottom member 12 shown as a blank (before folding). The blank may be made from a single die cut paper sheet or, preferably, from two or more die cut paper sheets (plies) laminated together in flat orientation.

The bottom member 12 comprises a top panel 16, two opposing substantially triangular side panels 18, at least one and preferably two bottom panels 20, a (first) tabbed closure flap 22 and a (second) slotted closure flap 24.

The top panel 16 is rectangular and elongated and has a front edge 26, opposing side edges 28 and a rear edge. The rear edge of the top panel 16 is defined by free rear edges 30 and a fold line 39 co-linear with the free rear edges 30.

A rear extension flap 34 is hingedly affixed to the top panel 16 along the fold line 39 and extends rearward from the top panel 16, terminating in a second rear edge 32. The rear extension flap 34 has side edges 36 and may be narrower than the rest of the top panel 16. One or more fold lines 38 may extend across the rear extension flap 34 in the transverse (sideways) direction, dividing the rear extension flap into multiple sections.

The triangular side panels 18 are foldably connected to the top panel 16 along the top panel side edges 28. Each side panel 18 has a bottom edge 40 and a side panel rear edge 42 perpendicular to the bottom edge 40. Each side panel 18 defines a right triangle with the side edge 28 forming the hypotenuse. The side panel bottom edge 40 meets the top panel side edge 28 at a point (P), preferably located a small distance rearward of the top panel front edge 26.

The tabbed closure flap 22 is attached to one of the side panels 18 along the side panel rear edge 42. The tabbed closure flap 22 has top and bottom edges 44, 46 and a rear edge 48. A tab 50 extends from the rear edge 48 and is configured to cooperatively engage a slot 52 in the slotted closure flap 24 when the tabbed closure flap 22 and the slotted closure flap 24 are folded inward during assembly of the ramp 10.

The slotted closure flap 24 is attached to the other side panel 18 along its rear edge 42. The slotted closure flap 24 defines top and bottom edges 54, 56 and a rear edge 58. As already noted, the slot 52 is positioned so that the tab 50 cooperatively engages the slot 52 when the tabbed closure flap 22 and slotted closure flap 24 are folded inward during assembly of the ramp 10.

Figure 8A:
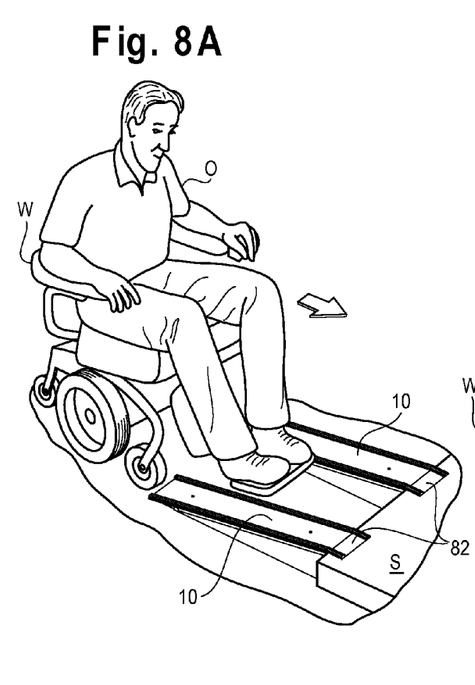
FIGS. 8A through 8C are perspective views of the ramps of FIG. 1 shown being used by a wheelchair operator.
Figure 8B:
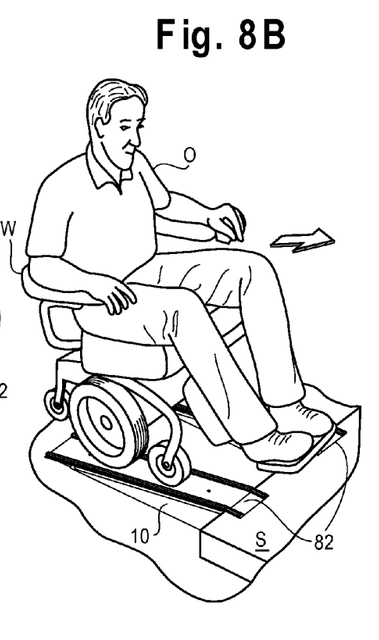
Figure 8C:
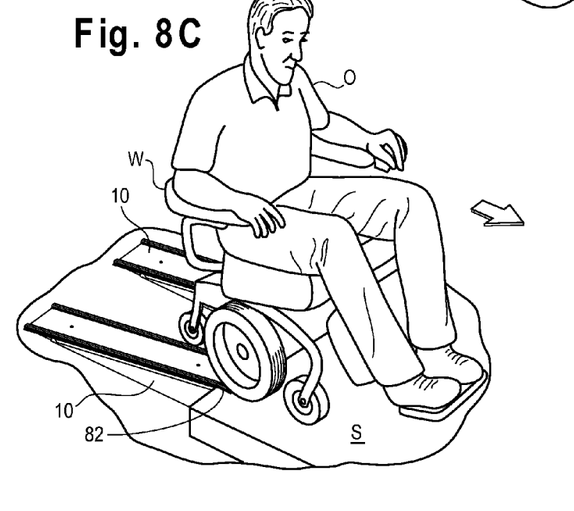

In an important aspect of the invention, the closure flaps 22, 24 are trapezoidal in shape so as to fit snugly within the interior space defined by the folded bottom member 12. Specifically, when pushed inside the interior space of the folded bottom member 12, the bottom edges 46, 56 of the closure flaps 22, 24 abut a bottom panel 20 and the top edges 44, 54 abut the underside of the top panel 68. This configuration results in a surprisingly strong paper ramp 10 capable of bearing the weight of a typical office product (P) (FIGS. 9A-9C) or even the weight of a person (O) in a wheelchair (W) (FIGS. 8A-8C).

Figure 6:
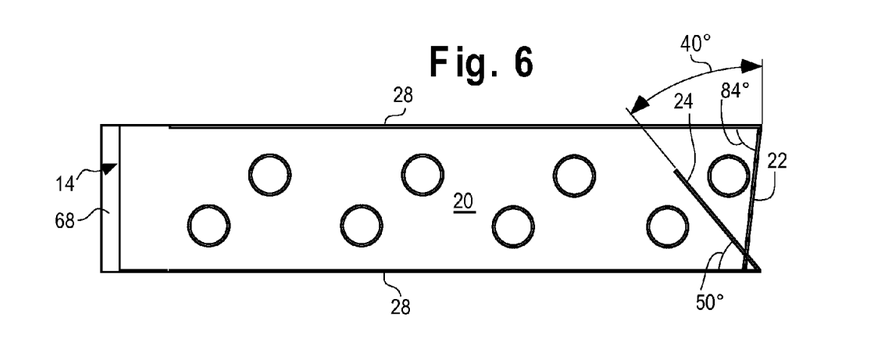
FIG. 6 is cross sectional view of the paper ramp of FIG. 5 taken along line 6-6 to show interior details.

More specifically, while the bottom edge 46 and the front edge 42 of the tabbed closure flap 22 are square (define a right angle), the top edge 44 and rear edge 48 form an obtuse included angle. In the assembled bottom member 12 the top edge 44 of the closure flap 22 is angled slightly downward from where it meets the side panel 18 so that the entire length of top edge 44 abuts the underside of the top panel 16 when the tabbed closure flap is pushed inside the wedge-shaped stricture as shown in FIG. 6. Likewise, while bottom edge 56 and front edge 42 of the slotted closure flap 24 are square, top edge 54 is angled slightly downward so that it abuts the underside of the top panel 16 along the entire length of the top edge 54.

Returning to FIGS. 1-3, each bottom panel 20 is foldably connected to a side panel 18 along the side panel bottom edge 40. Each bottom panel 20 is substantially rectangular and defines a distal edge 60 located away from and parallel to the side panel bottom edge 40, a front edge 62 and a rear edge 64. The front edge 62 of each bottom panel 20 meets the top panel side edge 28 at the same point (P) where the side panel bottom edge 40 also meets the top panel side edge 28. Thus, three edges or lines 28, 40, 62 converge at point (P). Optionally, each bottom panel 20 may be perforated with holes 66 to reduce the overall weight of the ramp 10 without compromising strength.

Figure 4:
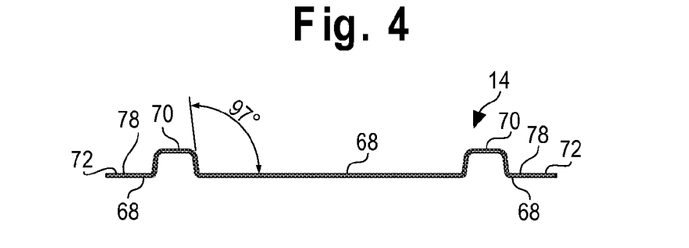
FIG. 4 is a cross sectional view of the top member of FIG. 2 taken along line 4-4.

FIG. 4 is a cross sectional view of the pre-formed top member 14 of FIG. 2 taken along line 4-4. The top member 14 is made from a paper blank that has been pre-formed into a desired shape, typically one incorporating guide rails 70. As shown in the figures the top member 14 comprises two parallel raised rails 70, a flat (planar) upper panel 68 that extends between the raised rails 70 and slightly outside of the raised rails 70, and two side flaps 72. The side flaps 72 extend out from the flat upper panel 68 along fold lines 78 and have rear edges 81. The upper panel 68 is substantially rectangular and extends from a front edge 74 to a rear edge fold line 79 (co-linear with rear edges 81) and from one side edge 78 to the opposite side edge 78. When placed onto the bottom member 14 the top member upper panel 68 is substantially coextensive with the bottom member top panel 16. A rear extension panel 82 extends rearward from the upper panel 68, terminating in a rear edge 76, and is hingedly attached to the upper panel 68 along the fold line 79.

Each top member side flap 72 is hingedly connected to the upper panel 68 along one of the side edges 78 and can be folded downward during assembly of the ramp 10 as will be described. The side panels 72 extend from a distance rearward of the front edge 74 to the rear fold line 79.

The rails 70 are located in spaced parallel relationship to each other and may extend axially (lengthwise) along the entire length of the top member 14. The exact shape (profile) of the rails 70 can vary. In general they are raised a desired height above the surface of the upper panel 68, which in one working example was 0.38 inches (0.965 cm). The rails 70 function as guides or barriers to help keep the casters or wheels of the article (A) on the ramp 10. Preferably the rails 70 are integrally formed in the top member 14, such as by first cutting a flat paper member to the desired dimensions and then forming the rails 70 using a die press. Alternatively, the rails can be formed as separate members which are then glued or otherwise adhered to the upper panel 68.

The rails 70 may be similar is shape to the M-shaped rails described in co-owned U.S. Pat. No. 7,597,053 incorporated herein by reference.

Assembling the Paper Ramp

The paper ramp 10 is made by folding a die cut blank such as the one shown in FIGS. 2 and 3 into the wedge shaped bottom member 12 and then affixing to it the pre-formed top member 14.

To form the bottom member 12, the side panels 18 are folded downward along side edges 28 until the side panels 18 are perpendicular to the top panel 16. Next, the bottom panels 20 are folded inward (toward each other) along bottom edges 40 until the bottom panels are in flat abutting relationship with each other, thus forming the general wedge shaped structure. The bottom panels 20 may be adhered to each other with adhesive or by other means. Finally, slotted closure flap 24 and tabbed closure flap 22 are folded inwardly as shown in FIG. 6 and tab 50 is inserted into slot 52.

In one working example slotted closure flap 24 was folded inside the wedge shaped structure until it defined about a 50 degree included angle with the side panel 18 to which it is attached. Likewise, tabbed closure flap 22 was folded inside the wedge shaped structure until it defined about an 84 degree included angle with the side panel 18 to which it is attached. When folded in this way, the top edge 54 of the slotted closure flap 24 and the top edge 44 of the tabbed closure flap 22 abut the underside of the top panel 16 along their entire length. Put another way, the slotted closure flap 24 and the tabbed closure flap 22 extend from the bottom panels 20 to the underside of the top panel 16. As a result, these two closure flaps 22, 24 add surprising load bearing support to the ramp 10.

As previously described, the top member 14 may be formed by first cutting a flat paper member to the desired dimensions and then forming the rails 70 using a die press. The pre-formed top member 14 is then affixed to the folded bottom member 12 using adhesive or other means. The top member rear extension panel 82 may be affixed to the bottom member rear extension flap 34 with the bottom member rear extension flap 34 partly folded under as shown in FIG. 5.

Figure 5:
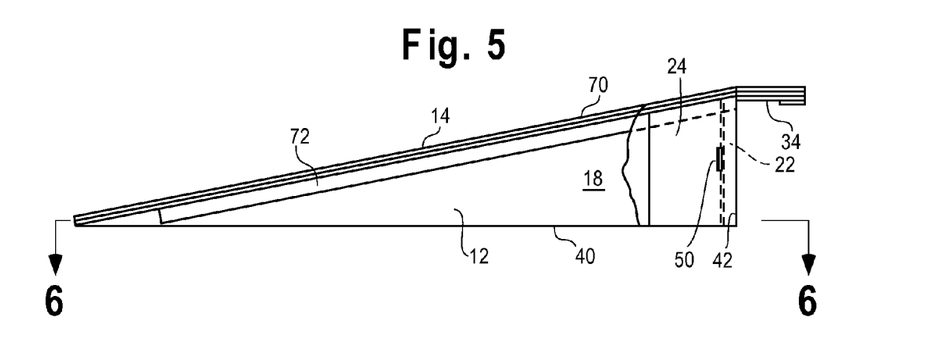
FIG. 5 is a right side partial cutaway view of one of the paper ramps of FIG. 1.

The finished, assembled ramp 10 is shown in FIGS. 1, 5 and 6. When assembled, the ramp 10 comprises a sloping (inclined), rectangular, load bearing upper panel 68 with a pair of raised rails 70; triangular, vertically oriented side panels 18 extending downward from the upper panel 68; and bottom panels 20 folded inwardly underneath the upper panel 68. Despite being made of paper or paper based materials, the wedge shape and inwardly folded closure flaps 22, 24 create a ramp 10 having surprising load bearing strength.

Using the Ramp

To use the assembled ramps 10 the user positions the ramps 10 adjacent the base (B) as shown in FIG. 1. Preferably the ramp 10 is positioned with the side panel rear edges 42 abutting a vertical surface of the base (B) and the top member extension panel 82 extending over the horizontal surface of the base (B). The ramp 10 may be folded downward along fold lines 79, 39 so that the bottom member rear extension flap 34 and top member rear extension panel 82 rest on the base (B) as shown in FIG. 1. When installed in this fashion, the extension panel 82 is oriented in a substantially horizontal plane, whereas the upper panel 68 is sloped.

Figures 9A, 9B:
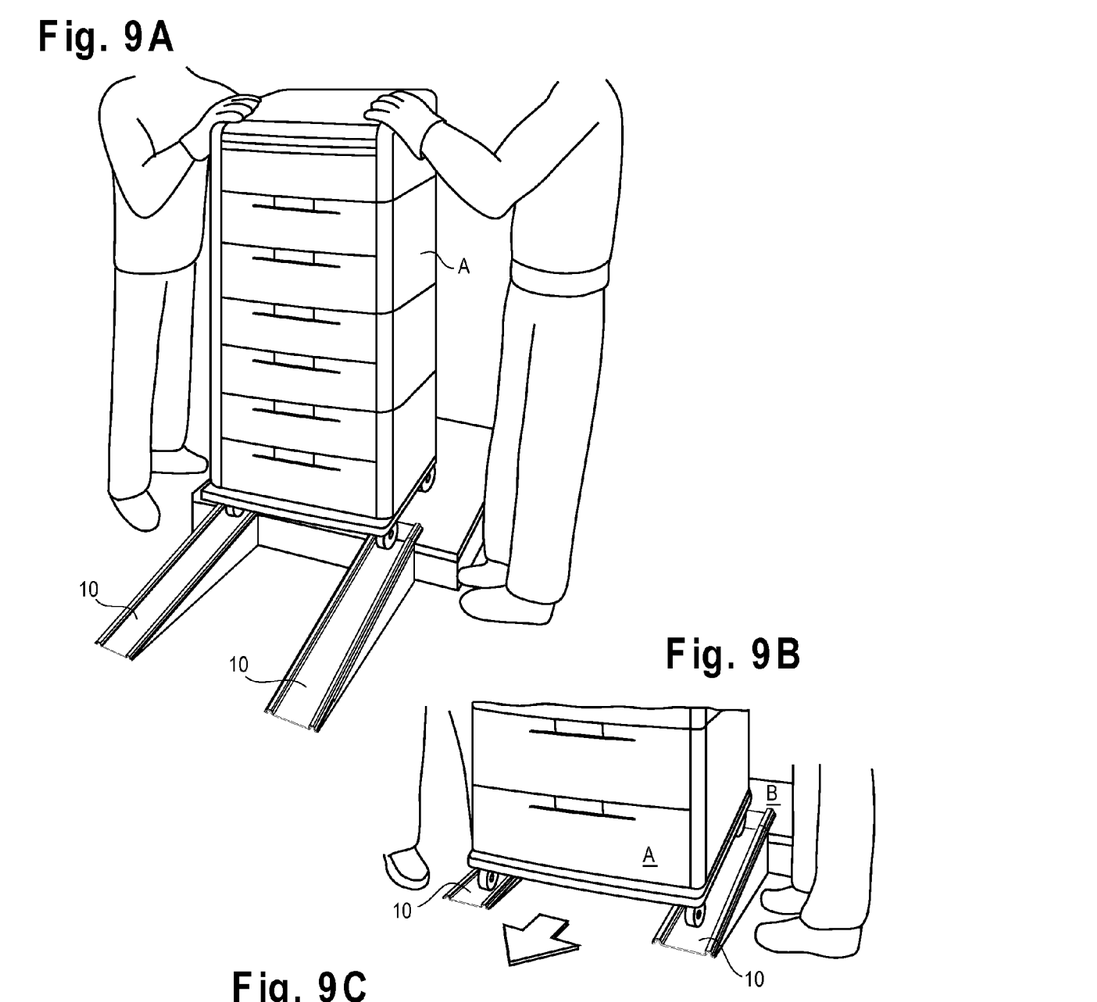
FIGS. 9A through 9C are perspective views of the ramps of FIG. 1 shown being used to unload an office appliance.
Figure 9C:
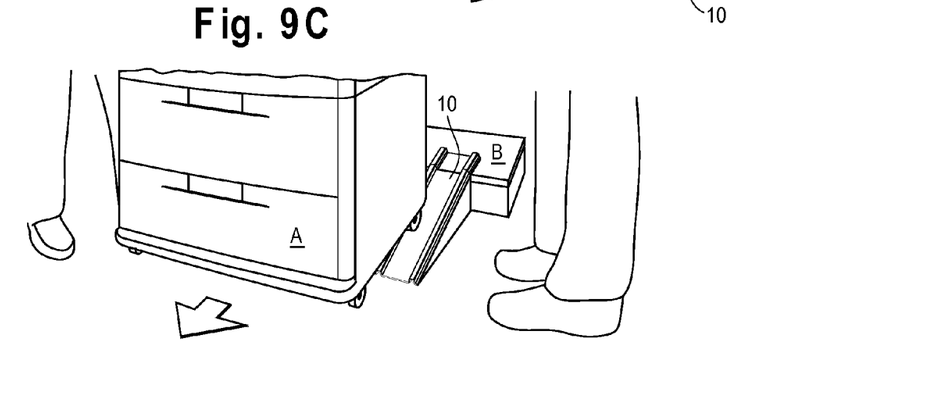

FIGS. 8A through 8C are perspective views of the ramps 10 shown being used by the operator (O) of a wheelchair (W) to maneuver the wheelchair (W) up the ramps 10 onto a step (S). FIGS. 9A through 9C are perspective views of the ramps 10 shown being used to unload an office appliance (A).

The ramp 10 may be used singly or in pairs. The ramp 10 may be shipped along with the packaged article (A) either unassembled (flat) or assembled.

Alternative Embodiment

Figure 7:
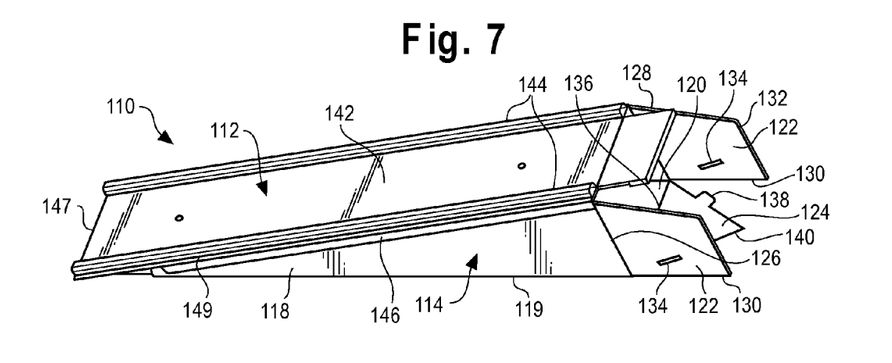
FIG. 7 is a perspective view of a partially assembled ramp according to a second embodiment of the present invention.

FIG. 7 is a perspective view of a partially assembled ramp according to a second embodiment of the present invention. The ramp 110 comprises a top member 112 similar to that in the first embodiment, but a slightly different bottom member 114. As in the previous embodiment, the bottom member 114 comprises a top panel, two opposing substantially triangular side panels 118 and two bottom panels 120. However, the closure flaps are different.

As in the first embodiment, the top member 112 is an elongated piece of paper or paper based material comprising a flat upper panel 142, two parallel raised rails 144, and two side closure flaps 146. The upper panel 142 is substantially rectangular and defines a front edge 147, a rear edge and two opposing side edges 149. Each side closure flap 146 is connected to the upper panel 142 along one of the side edges and is folded downward during assembly of the ramp 110. The rails 144 are located in spaced parallel relationship to each other and extend axially (lengthwise) along the entire length of the top member 112 to function as guides or barriers to help guide the casters or wheels of an article being unloaded down the ramp 110. The rails 144 help insure that the castered or wheeled article does not roll off the side of the ramp 10. The rails 70 may be similar to the M-shaped rails described in co-owned U.S. Pat. No. 7,597,053 incorporated herein by reference.

Each bottom panel 120 is foldably connected to a side panel 118 along the side panel bottom edge 119. Each bottom panel 120 may be substantially rectangular and define a front edge and a rear edge 136.

The bottom member 114 has three closure flaps, namely, two opposing slotted closure flaps 122 and a third double tabbed closure flap 124. Each slotted closure flap 122 is trapezoidal in shape and is foldably attached to a side panel 118 along its rear edge 126. Each slotted closure flap 122 defines top and bottom edges 128, 130 and a rear or distal edge 132.

The double tabbed closure flap 124 is triangular and is attached to a bottom panel 120 along a rear fold line 136. A tab 138 extends from each angled edge 140 and is configured to cooperatively engage a slot 134 in one of the slotted closure flaps 122 when the tabbed closure flap 124 and the two slotted closure flaps 122 are folded inward during assembly of the ramp 110.

Thus there has been described a ramp 10, 110 made from a folded paper bottom member 12, 112 and a formed paper top member 14, 114 that can be used to load or unload a castered or wheeled article onto or off of a pallet or shipping base (B). The assembled ramp 10, 110 is substantially wedge shaped with a rearward extension which rests on the base (B) and a front edge that rests on the adjacent floor or ground. Despite being made of paper, the shape and construction of the assembled ramp 10, 110 results in a surprisingly strong load bearing structure. The ramp 10, 110 may include various means for stabilizing the ramp 10, 110 in its three dimensional form, including various interlocking tab arrangements as shown in the figures and described above.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

I claim as my invention:

1. A paper ramp for use in the unloading of a wheeled or castered product from a base having a horizontal surface, the paper ramp comprising:

a bottom member made from a paper blank folded into a wedge shaped structure defining an interior space and comprising an elongated sloping top panel having opposing side edges and an underside, two vertically oriented, opposing, triangular side panels foldably attached to the top panel along the opposing side edges, each side panel defining a bottom edge and a rear edge and a plane, two horizontally oriented bottom panels, each bottom panel hingedly attached to one the side panels along the bottom edge of the side panel and folded inward along their respective bottom edges so that the bottom panels are in flat abutting relationship with each other, a first closure flap hingedly attached to one of the side panels along the rear edge, and a second closure flap hingedly attached to the other side panel along its rear edge, the first and second closure flaps defining planes, the first and second closure flaps being folded inside the wedge shaped structure interior space so that the plane defined by the first closure flap forms an acute included angle with the plane defined by the side panel to which the first closure flap is attached and the plane defined by the second closure flap forms an acute included angle with the plane defined by the side panel to which the second closure flap is attached, the first and second closure flaps each having a slanted top edge that is co-planar with and abuts the underside of the top panel and a horizontal bottom edge that is co-planar with abuts the horizontally oriented bottom panel so that the first and second closure flaps abut and support the sloped top panel along their entire top edges; and a separate pre-formed paper top member comprising an elongated flat upper panel having a length, opposing side edges and two integrally formed, raised rails located in spaced parallel relationship to each other and extending the length of the upper panel, the top member further comprising side flaps extending downward from the side edges and a rear extension panel extending rearward from the upper panel and hingedly attached thereto along a fold line and configured to extend over and rest on the horizontal surface of the base;

wherein the top member is affixed to the bottom member such that the upper panel is substantially coextensive with the sloping top panel.

2. The paper ramp of claim 1 wherein the second closure flap defines a slot and the first closure flap includes a tab which cooperatively engages the slot when the ramp is assembled.

3. The paper ramp of claim 1 wherein the bottom member further comprises a rear extension flap hingedly affixed to the top panel along a fold line and extending rearward from the top panel, and wherein the rear extension panel adjoins the rear extension flap.

4. The paper ramp of claim 1 wherein the first closure flap has a free top edge, a free bottom edge and a free rear edge extending between the top and bottom edges, the free bottom edge and the free rear edge forming a ninety degree included angle, the free top edge and the free rear edge forming an obtuse included angle, the free top edge having a length, wherein the free top edge abuts the underside of the top panel along the entire length of the free top edge when the ramp is assembled.

5. The paper ramp of claim 4 wherein the second closure flap has a free top edge, a free bottom edge and a free rear edge extending between the top and bottom edges, the bottom edge and rear edge forming a ninety degree included angle, the top edge and rear edge forming an obtuse included angle, the top edge having a length, wherein the top edge abuts the underside of the top panel along the entire length of the top edge when the ramp is assembled.

6. A method of using a paper ramp to off-load an article from a base, the method comprising the steps of:

providing a paper ramp having a bottom member and a separate pre-formed top member according to claim 3;

shipping the bottom member to the user in its flat, unfolded configuration along with the pre-formed top member;

folding the flat bottom member into a three dimensional wedge shaped structure;

affixing the pre-formed top member to the bottom member to form the paper ramp; and positioning the paper ramp against the base with the rear extension panel overlaying the base.

7. The paper ramp of claim 1 wherein:

the plane defined by the first closure flap is perpendicular to the bottom panels; and the plane defined by the second closure flap is perpendicular to the bottom panels.

* * * * *